Aug. 29, 1972 M. BOURGEAUX 3,687,649
METHOD FOR THE SURFACE TREATMENT OF GLASS
Filed Oct. 23, 1969 2 Sheets-Sheet 1

INVENTOR.
MAURICE BOURGEAUX
BY
Bauer and Seymour
ATTORNEYS

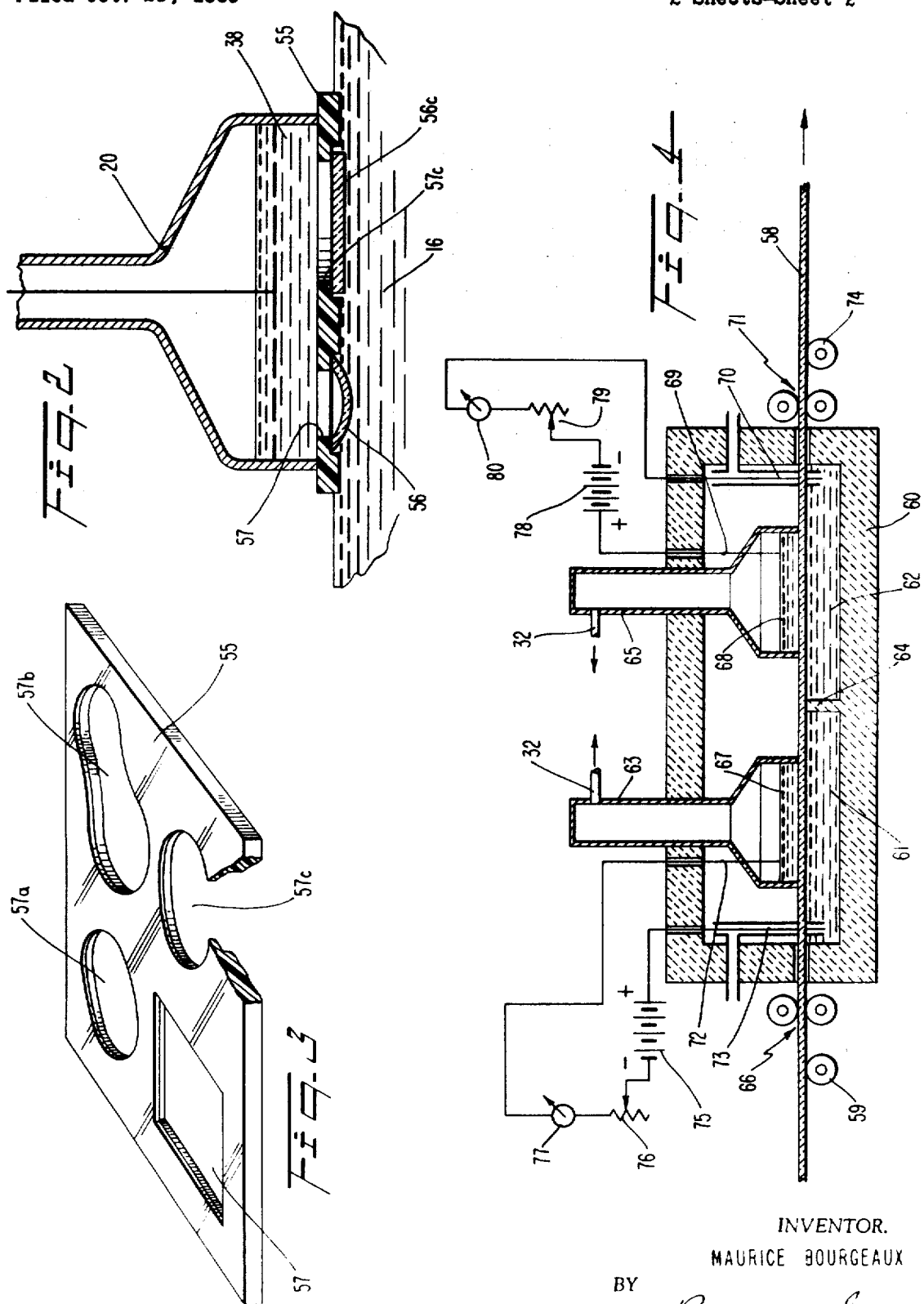

United States Patent Office 3,687,649
Patented Aug. 29, 1972

3,687,649
METHOD FOR THE SURFACE TREATMENT OF GLASS
Maurice Bourgeaux, Paris, France, assignor to Compagnie de Saint-Gobain, Neuilly-sur-Seine, France
Filed Oct. 23, 1969, Ser. No. 868,745
Claims priority, application France, Oct. 28, 1968, 171,579
Int. Cl. C03c 21/00
U.S. Cl. 65—30    12 Claims

ABSTRACT OF THE DISCLOSURE

Method and apparatus for improving the properties of glass by the replacement of ions in the surfaces of the glass by larger ions. The lower surface of a piece of glass to be treated is put in contact with an electrically conducting molten salt bath, a layer of electrically conducting liquid is held under vacuum in contact with the upper surface of the glass, and a D.C. source is connected between the two baths. The originally upper surface of the glass is similarly treated in a later step wherein the glass is inverted. Alternatively, a continuously moving ribbon of glass may be treated in successive stages, the first of which treats one surface of the glass ribbon and the second of which treats the other surface thereof.

This invention relates to a method of and an apparatus for the surface treatment of glass. The invention is particularly concerned with the improvement of mechanical properties of glass in sheet form by the replacement of alkali ions in the surface layers of the glass by larger cations at a temperature sufficiently low that there is insufficient time for the forces of compression which have formed in such surface layers to be relaxed. The larger cations may be those, for example, of potassium.

It is well known that such substitution of ions may be obtained by reason of the diffusion which results from thermal agitation, as by immersing the objects to be treated in baths of molten salts such as, for example, potassium nitrate.

The above-described treatment takes a very long time; it has also been found that the treated glass may not retain its original high resistance to abrasion because outer layers of the glass under compression are thin. To obtain compression layers of sufficient thickness to produce a strong and durable glass, and also to decrease the time required for ion exchange, it has been proposed to employ glass compositions in which the mobility of the alkaline ions is higher than that of classical compositions. However, it is not always convenient to modify the composition of a glass which is to be used under conditions in which it is subjected to pressure.

In order to improve the treatment and to increase the depth of diffusion of ions into the glass, in a prior improvement of the basic method an electric field has been applied in order to cause an electromigration of the ions. Briefly, such improved prior method is applied to the treatment of flat sheets of glass, and is usually employed in the successive treatment of the two faces of the glass sheet. In a first stage of the method, an electric field is applied to the glass sheet, the field being of such polarity that potassium ions are forced to migrate toward the interior from a first face, the first face being thereby placed under a surface compression. At the price of some loss in the gain achieved by such first treatment, it is possible to reverse the polarity of the applied electric field for a short time, so as to obtain a compression layer on the opposite face. The simplest manner of practicing such method consists in placing the sheet of glass to be treated between two baths of molten salts which constitute the two compartments, one anodic and the other cathodic, by means of which the electric field is applied to the sheet of glass.

The separation of such two compartments presents a difficult problem because of the high resistivity of the glass which causes any leakage of the salts to produce a short circuit; also, the sheet of glass is progressively deformed in the course of the treatment, the first face treated becoming convex as a result of its being subjected to surface compressive forces, following which the sheet of glass straightens during the treatment of the second face. In order to avoid all danger of breakage, the edges of the glass must not be embedded but must be left free for deformation; this frequently causes leakage of the salts from the two compartments. In addition, it would be preferable that the potassium ions diffuse across all the surface of the glass without excepting the edges; this has not been possible with prior known methods and apparatus.

It should also be noted that the cathodic bath becomes progressively more alkaline during the course of the electrolysis, and that this tends to damage the surface of the glass. In order that the condition of the surface shall remain satisfactory it is necessary to neutralize the alkalinity of the cathode bath during the course of the treatment.

The present invention has as an object the improvement of the method of treatment utilizing electromigration; it permits the entire surface of a sheet of glass, including its edges, to be improved mechanically without the risk of breakage and without alteration of its optical properties.

The method of the invention, in each one of the two stages of the treatment, consists in placing the sheet of glass in contact, through its lower face, with a treatment bath and in maintaining through the use of a vacuum a layer of electroconductive liquid in contact with the upper face of the sheet. An appropriate direct current voltage is applied between the two baths.

Advantageously, the sheet of glass will be deposited upon the treatment bath in such manner that the upper surface of the bath will contact the edges of the sheet of glass at a depth which is at least approximately midway of its thickness. The layer of electroconductive liquid maintained on the upper surface of the sheet may advantageously be of the same nature as the liquid of the treatment bath. It is to be understood that by the term "vacuum" is meant a sub-atmospheric pressure; such pressure may vary from a few millimeters to a number of decimeters of mercury absolute.

The invention also includes an apparatus for carrying out the above described method. Such apparatus includes an electrolytic bath connected to one pole of a source of direct current, the apparatus being provided with a vacuum bell having a lower edge contour or shape adapted to receive the sheet of glass to be treated. Such vacuum bell contains a layer of electroconductive liquid which is held in contact with the upper face of the sheet of glass. The liquid within the bell is connected by means of an electrode to the other pole of the direct current source.

Other characteristics and advantages of the invention will appear in the following description of an illustrative apparatus shown in the drawings annexed hereto. In such drawings:

FIG. 2 is a schematic view of a variant of FIG. 1 for treating a plurality of small glass objects;

FIG. 3 is a view in perspective of a detail of FIG. 2; and

FIG. 4 is a view in vertical section of a further variant according to the invention, such apparatus providing for the continuous treatment of bands of glass.

Figure 1:
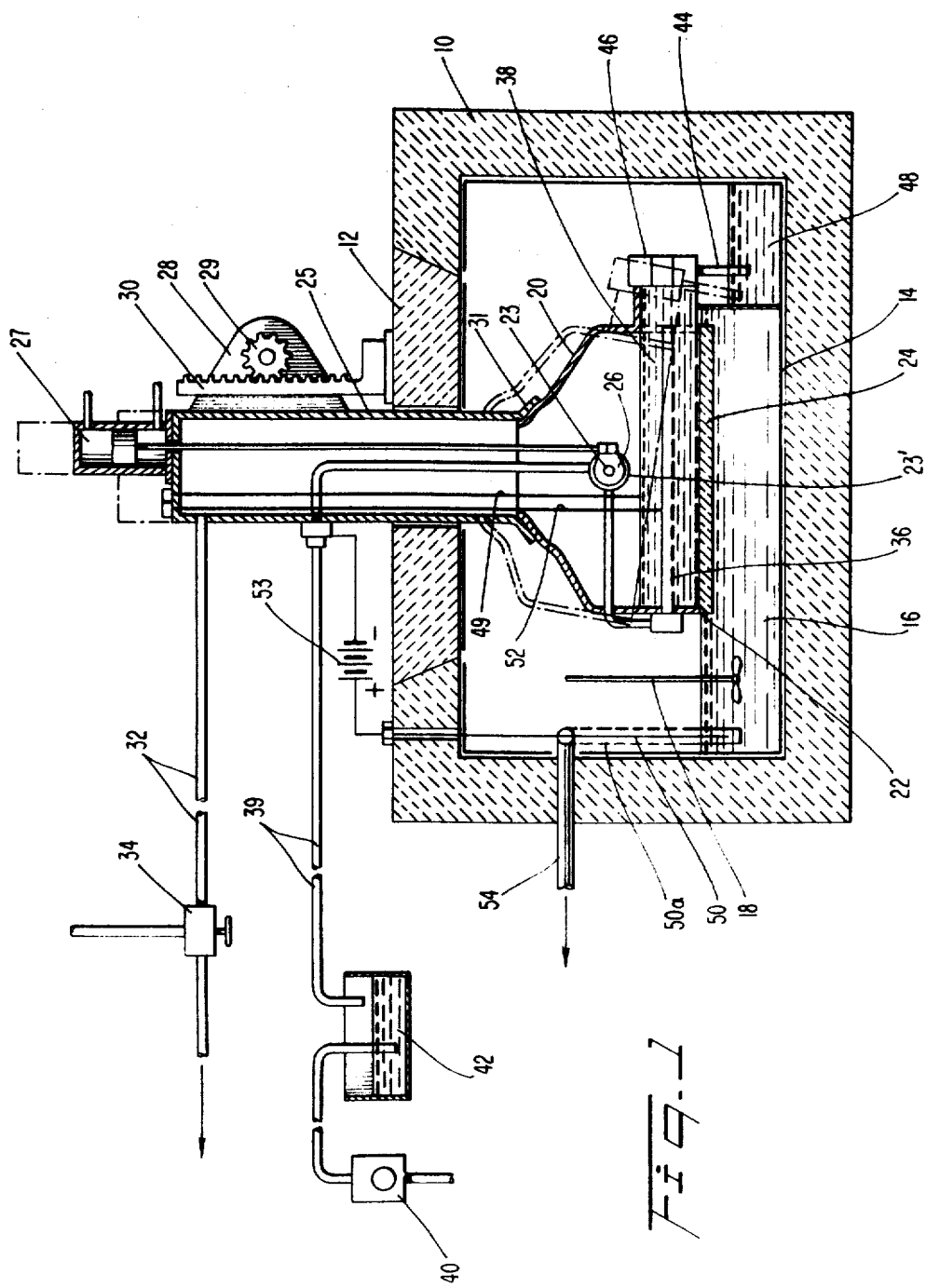
FIG. 1 is a view in vertical section of a first embodiment of the apparatus of the invention.

Referring now to FIG. 1, it will be seen that the apparatus there shown includes a heat insulating enclosure 10 provided with a removable roof 12 and a tank 14 which is made up of a lining preferably made of aluminum or an insulating material. The tank 14 is partially filled with a bath 16 of molten salt, $KNO_3$ for example, which is heated electrically by resistant heaters (not shown). Agitators 18 are provided within the enclosure to maintain the bath 16 homogeneous, said agitators being driven by a motor (not shown) disposed exteriorly of the tank. The enclosure 10 contains one or a plurality of vacuum bells 20 (one shown) the lower edges 22 of which are smooth and have an outline which is the same as but slightly smaller than the outline of the sheet of glass 24 to be treated. If the bells 20 are not electrically insulating the lower edge portion 22 thereof is made of a support member which is electrically insulating.

The vacuum bell 20 is provided with means permitting the sheet of glass 24 to be mounted in horizontal position and to be partially immersed in the bath 16, as shown in FIG. 1, with the upper surface of the bath 16 extending substantially halfway up the side edges of the glass. In the embodiment of the apparatus shown, the bell is swivelly connected at 23 by means of a stirrup or holder (not shown) to a column 25 which is vertically reciprocable in a guideway. The vertical piston rod of a double-acting cylinder 27 is pivotally connected to a cross member 26 affixed to the bell; this permits the bell to be held in horizontal position as shown in solid lines in FIG. 1 or to be tipped somewhat as shown in phantom lines in that figure. The column 25 carries an electric motor 28 the shaft of which has a pinion 29 affixed thereto. The pinion meshes with a vertical rack gear 30 which is affixed to the roof 12 of the enclosure. It will be evident that upon the rotation of the motor in opposite directions the column 25 is selectively caused to rise and descend.

The entirety of the column 25 and of the vacuum bell 20 is connected to a vacuum pump (not shown) by a conduit 32 in which there is interposed a 3-way valve 34. The bell 20 is permitted to tip into its phantom line position by reason of the connection 31 between it and the column 25; such joint becomes vacuum tight when the bell is lowered into its full line position. A horizontal perforated tubular cathode 36 is immersed in the electroconductive liquid bath 38 maintained in the bell 20. Air is sucked into the bell through the perforations in cathode 36, such air passing through a vacuum regulator 40 into a bubble tank 42 containing a nitric acid solution. From tank 42 the air passes through a conduit 39 which is connected through a swivel joint at 26 to a pipe leading to cathode 36. Air escaping through the perforations in cathode 36 constantly stirs the bath; the nitric acid entrained in such air neutralizes the bath 38.

In order to maintain the bath 38 within the bell 20 at a desired level, there is provided a conduit 44 in which there is interposed a remotely operated valve 46 so as to permit the vacuum bell to be fed by a sucking action from an auxiliary tank containing a bath 48 which is also filled, for example, with $KNO_3$. The valve 46 may be controlled exteriorly of the enclosure by an appropriate mechanical or pneumatic means energized, for example, by means of an electrode 49 which causes the valve 46 to close when a proper height of the bath 38 is attained. In the embodiment shown, the bath 48 is independent of the bath 16, although it is to be understood that the bath 48 may be replenished in other ways.

The anodes 50 of the tank 14 are disposed in multiperforated cells or tubes 50a which are connected to an exhaust conduit 54 so as to permit the gaseous exhaust of the closure 10.

The above-described apparatus operates as follows:

After the vacuum bell 20 has been raised into its upper position, the sheet of glass 24 to be treated is introduced laterally thereunder by means of a carrier platform or similar device (not shown). A vacuum is created in the bell 20 by turning the valve 34 into a proper position; the vacuum raises the sheet 24 against the lower edge 22 of the bell. The bell is then lowered until the lower face of the glass sheet 24 is wet by the solution of bath 16 and the edges of the sheet are partially immersed in such solution. The valve 46 is then open in order partially to fill the auxiliary space within the bottom part of the bell with a molten salt solution ($KNO_3$) which is taken up from the tank 48.

A source of direct current, in this case a battery 53, is connected between the anode 50 and the cathode 36. The treatment of the glass sheet then commences. The potassium ions of the anodic bath penetrate into the glass sheet 24 over all of its immersed surface including the edges of the sheet located below the top surface of the bath 16. Under the effect of the treatment, the sheet of glass tends to become bent with the convex surface of the glass disposed downwardly. Such deformation of the glass sheet tends to cause leakage between the upper edge of the sheet and the lower edge 22 of the bell, but this can be overcome by employing a vacuum of sufficient strength that the bending of the sheet 24 causes a variation in the depth of the bath 38. Such variation in depth may be detected with the aid of an electrode 52 which controls the regulation of the vacuum or may even interrupt the treatment when the potassium ions have penetrated into the glass to a sufficient extent. It is to be understood that instead of continuous direct current, a source of interrupted direct current may be connected between the anode 50 and the cathode 36.

The vacuum bell is then raised by energization of motor 28. It is possible to tip the sheet of glass when the bell is in its elevated position in such manner as to place the conduit 44 in a lowered position. One can then proceed to reduce the vacuum within the bell to a value which permits the sheet of glass to be removed therefrom. The sheet is then turned over and is again mounted on the lower end of the bell preparatory to the treatment of the other face of the sheet.

Alternatively, the second phase of the treatment may be carried out in a second similar furnace. The sheet of glass being now concave in an upward direction, it is necessary by use of the cylinder 27 to cause the sheet of glass to penetrate the bath 16 in an inclined direction in order to avoid the formation of a pocket of air, following which the sheet of glass is placed into its operative, horizontal position.

After the treatment has been completed, that is to say when the sheet 24 has again become flat, the detector 52 cuts off the current and may even control the operation of removing the glass sheet. The treated sheet is cooled in the air and then washed in order to remove adherent salt therefrom.

The electrolytic action in the anodic compartment causes the generation of a large amount of nitric vapors. It is thus preferable not to use the tank 14 as an anode, but to construct the furnace as has been indicated above and to carry the tank at an intermediate voltage. The electrolytic action in the cathodic bath liberates an alkalinity which is necessary to neutralize. This is the reason why in the example chosen, the cathode 36 is made of such form as to permit the bubbling of the nitric vapors. In any event, the cathode 36 is progressively polarized and so it must be periodically renovated or renewed. The bell 20 is fed by a separate solution and not from the tank 14; the upper solution is thus not contaminated by the lower solution. In contrast thereto, the lower tank is contaminated by sodium; because of their great mobility, sodium ions tend to "short circuit" the migration of potassium ions.

In a variant construction shown in FIG. 2, the bell 20 permits the simultaneous treatment of a large number of small pieces of glass. Such pieces of glass are carried by a lower plaque 55 which is made of insulating material and has a number of holes 57a, 57b, 57c therethrough having forms and dimensions close to that of the respective pieces of glass 56, etc. to be treated. Each of such holes receives a piece of glass to be treated, after which the bell is placed under vacuum, which causes the pieces of glass to seal against the plaque 55 and the plaque to seal against the lower edge of the bell 20. The manners of treatment of the pieces of glass are the same as those in the method described above.

The embodiment shown in FIG. 4 provides for the continuous treatment of a ribbon 58 of glass which is maintained at a temperature sufficiently high to melt the salt and to render the glass electroconductive. A furnace 60 is provided with two aligned compartments 61, 62 separated by a transverse partition 64. There is a vacuum bell 63 and 65 in each of the respective compartments. The compartments 61 and 62 are filled with a bath of molten salt, and the ribbon of glass is suspended by the vacuum created within the bells 63 and 65 which contain electroconductive solutions 67 and 68. The glass ribbon 58 slips along the bottoms of bells 63, 65 as it travels.

A cathode 70 penetrates into the compartment 62 and an anode 69 penetrates the bath 68. In order that both faces the ribbon 58 shall be treated continuously, electrode 72 in the bell 63 constitutes a cathode and the electrode 73 of the bath 61 constitutes an anode. The glass ribbon 58 travels toward the furnace 60 upon conveyor rolls of which one is shown 59 and is thrust into the furnace by pinch rolls 66. The glass ribbon is withdrawn from the furnace by pinch rolls 71 and is forwarded to conveyor rolls of which one is shown at 74. Electrodes 72 and 73 are connected to opposite terminals of a battery 75 through a rheostat 76 and a voltmeter 77. The electrodes 69 and 70 in the second compartment of the furnace are similarly connected to the opposite terminals of a battery 78 through a rheostat 79 and a voltmeter 80.

In the course of its travel along the surface of the molten nitrate baths in the two compartments the ribbon of glass is simultaneously subjected to two electromigration treatments which cause a symmertical reinforcement on the upper and lower faces of the ribbon. The edges of the ribbon are not thus treated.

In the case in which the ion exchange is continuous the treatment in the second tank differs from that first described as to (a) its duration, that is to say by the length of the tank, as well as by (b) the voltage of the current source applied.

As an example of the treatment, a glass plate was subjected as in the drawings to ion exchange in an agitated acid bath of $KNO_3$ at a temperature of 450° C. at a current density of 10 ma./cm.$^2$ and a voltage varying from 60–100 volts. If successive treatments are used, the first of 60 minutes and the second of 35 minutes (applied in succession to opposite faces of the glass) there will be produced a thickness of penetration of potassium ions on the order of 100 microns on each face.

It should be borne in mind that among glass products of ordinary constitution the atoms in the skeleton (silica and aluminum) are immobile, the mobile ions being monovalent cations of small size such as silver and copper, and especially alkali metal ions, potassium, sodium, and lithium and, with greater difficulty, the alkaline earth metals and magnesium.

When glass is to be strengthened without coloration there are two recommended processes, the first being to introduce potassium electrochemically and the second to introduce lithium thermally and thereafter to introduce sodium or potassium electrochemically. The ideal electrolyte for stability at low temperature of fusion is potassium nitrate.

The present invention is basically related to the use of vacuum to separate the two components without using special joints while employing liquid electrolytes. This invention is applicable to and useful with all types of electromigration and is not limited solely to the displacement of small by large ions.

The reacidification by bubbling vapors charged with nitric acid through the electrolyte is not novel in itself, although useful as a step in this process. The same is true of the depolarization of electrodes.

It is to be understood that the invention is not to be limited to the embodiment shown and described but that it is capable of considerable variation as to details. Thus, for example, in accordance with the invention, there may be introduced into the glass ions which modify properties other than mechanical properties, for example, electrical and/or optical properties, chemical durability, and so on.

What is claimed is:

1. The method of treating the surface of glass by the substitution of larger alkali ions for smaller alkali ions in such surface, comprising, disposing said surface in contact with a first electrically conductive alkali-ion-supplying liquid, maintaining a layer of a second electrically conductive liquid out of contact with said first electrically conductive liquid and in contact with the opposite surface of the glass, and establishing a potential difference between said first and second liquids to effect ion substitution as aforesaid, the surfaces of the glass being disposed generally horizontal, that one of the first and second electrically conductive liquids in contact with the upper surface of the glass being maintained under vacuum.

2. The method of claim 1, the glass, in being passed continuously in translation between the first and second liquids being progressively subjected to ionic substitution.

3. The method of claim 2, and after each surface area of the glass has been treated by and between the first and second liquids, sequentially and successively passing such areas in continuous translation of the glass, between and in contact with third and fourth electrically conductive discrete liquids, respectively, and establishing a second potential difference between said third and fourth liquids, said second potential difference having a polarity to effect ion substitution in said surface of the glass initially in contact with said second electrically conductive liquid.

4. The method of claim 3 each of said third and fourth liquids being out of contact with each other.

5. The method of claim 4, said liquids being molten $KNO_3$ maintained at a temperature of about 450° C.

6. The method of claim 1, said second liquid being in contact with the lowermost surface of the glass, the glass being disposed thereon so that the level of the surface of the second liquid is below the upper surface of the glass.

7. The method of claim 1, and after treatment of a first surface of the glass as aforesaid, inverting the glass to put the opposite surface thereof into contact with the liquid formerly in contact with the first surface, and reestablishing a potential difference between the two liquids, as aforesaid.

8. The method of claim 2, the glass being in sheet ribbon form and of indefinite length, translating the ribbon in the direction of its length and with its surfaces in contact with said first and second liquids, as aforesaid, and subsequently contacting said first-named surface and said opposite surface of the ribbon with second and first liquids, respectively and between which a potential difference is established to effect ion substitution treatment in said opposite surface of the ribbon.

9. A method for treating a substantially horizontal surface of a glass object by electromigration of ions, comprising, engaging said surface with an ion-supplying electrically conductive liquid, engaging the opposite surface of the object with a layer of electrically conductive liquid, maintaining the two liquids out of contact with each other by the subjection of at least one of the liquids to a vacuum, and establishing a D.C. potential difference between the two liquids to cause a migration of ions from the ion-supplying liquid into the surface of the glass.

10. The method of claim 9, and maintaining said liquids and glass at a temperature promoting ion migration.

11. The method of claim 10, said liquids being molten $KNO_3$, said temperature being about 450° C.

12. The method of claim 9, the surfaces of the glass object being disposed generally horizontal, the liquid in contact with the upper surface of the object being subjected to vacuum.

References Cited

UNITED STATES PATENTS 3,486,995   12/1969   Evers _____ 204—130

GERALD L. KAPLAN, Primary Examiner
R. L. ANDREWS, Assistant Examiner

U.S. Cl. X.R.

204—130